(12) United States Patent
Hunag

(10) Patent No.: US 7,270,578 B2
(45) Date of Patent: Sep. 18, 2007

(54) POWER SUPPLY POWER COMPENSATION STRUCTURE

(75) Inventor: Yung-Hsin Hunag, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 0 days.

(21) Appl. No.: 11/291,983

(22) Filed: Dec. 2, 2005

(65) Prior Publication Data

US 2007/0128945 A1    Jun. 7, 2007

(51) Int. Cl.
*H01R 25/00* (2006.01)
(52) U.S. Cl. .................... 439/638; 439/498; 439/505; 439/623
(58) Field of Classification Search ............... 439/498, 439/505, 502, 623, 638, 651
See application file for complete search history.

(56) References Cited

U.S. PATENT DOCUMENTS 5,518,418 A * 5/1996 Larabell ..................... 439/505

6,361,372 B1 * 3/2002 Chiang ....................... 439/680
6,719,591 B1 * 4/2004 Chang ........................ 439/638

FOREIGN PATENT DOCUMENTS

| TW | M256525 U | 2/2005 |
|----|-----------|--------|
| TW | M260929 U | 4/2005 |

* cited by examiner

*Primary Examiner*—Tho D. Ta
(74) *Attorney, Agent, or Firm*—Birch, Stewart, Kolasch & Birch, LLP

(57) ABSTRACT

A power supply power compensation structure uses a connector as power output ports. The power supply has a feedback signal connector. A power output connector is coupled with a transmission line set which joins another connector to couple with the feedback signal connector. Thereby power output quality can be monitored to maintain optimal output power delivered to electronic devices.

6 Claims, 5 Drawing Sheets

POWER SUPPLY POWER COMPENSATION STRUCTURE

FIELD OF THE INVENTION

The present invention relates to a power supply power compensation structure and particularly to a power supply that provides a feedback power potential signal through a rear end electronic device via a joint wiring approach to maintain a constant potential for the voltage delivered to the electronic device to function steadily.

BACKGROUND OF THE INVENTION

In response to constant changes of Internet applications and multimedia functions, computer technologies also advance continuously. These days hardware such as hard disk drives, optical disk drives and disc burners have become fundamental facilities for users or server providers. Power supply also has to provide a greater amount of output power to meet the growing demands. The basic power of 250 W in the past is not enough now. Nowadays, 450 W, 500 W or even 600 W is required to support all the computer hardware being used. To enhance the power supply to meet the requirement of different electronic devices at the rear end, power output mode of the power supply also has significant changes. Connectors are widely used as power output ports these days. Such an approach, besides enabling users to select different power transmission lines, does not have wiring on the unused power output ports, and also can enhance air circulation in the computer to facilitate heat dissipation.

R.O.C patent Nos. M260929 and M256525 disclose a power supply with a connector on the rear end to serve as power output ports (referring to FIG. 1 of M256525 for wiring of the conventional power supply). Patent No. M260929 further proposes a design of composite output ports that has a power transmission line connecting to a same output port and branches to two or more connectors through a joint wiring approach to couple with electronic devices at the rear end.

While the aforesaid patents offer some improvements over the conventional power supply, they do not provide feedback power monitoring to maintain power quality. In fact, operation voltage actually delivered to the electronic devices from the power supply could drop due to line resistance of different transmission lines. Adopt the connector for the power output ports has constraints of potential specifications resulting to the pins of the connector. Without the power feedback function, the actual operation voltage is not sent back to the power supply to correct the fluctuating output voltage. The unstable output power quality directly affects operation of the electronic devices at the rear end.

SUMMARY OF THE INVENTION

The primary object of the present invention is to solve the aforesaid disadvantages. The invention provides a feedback power monitor structure while maintains the benefits of adopting the connector as power output ports for a power supply. The power supply has a feedback signal connector. A power output connector is coupled with a transmission line set which joins another connector to couple with the feedback signal connector. Thus power output quality can be monitored to maintain optimal output power delivered to the electronic devices.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
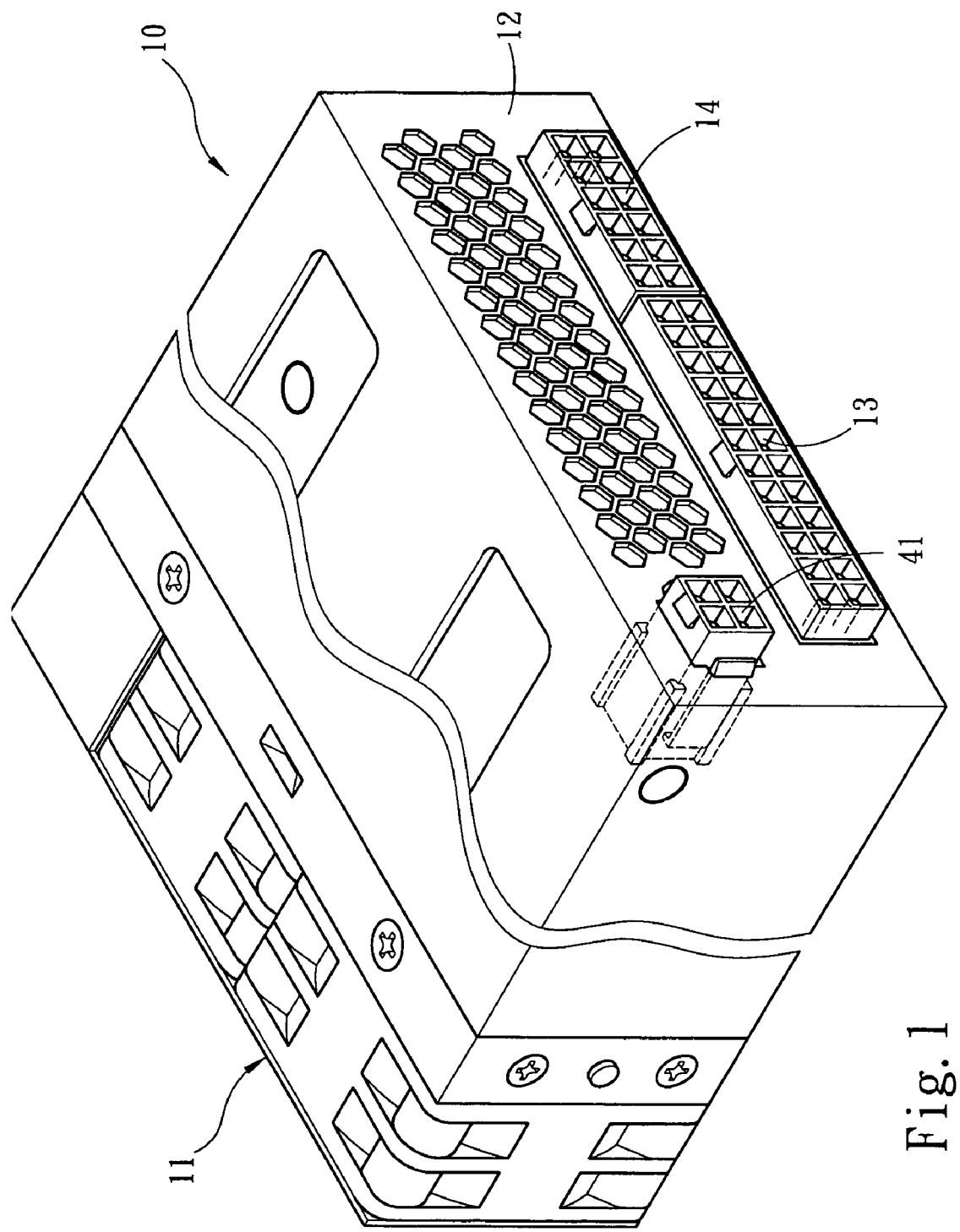
FIG. 1 is a perspective view of the power supply of the present invention.
Figure 2:
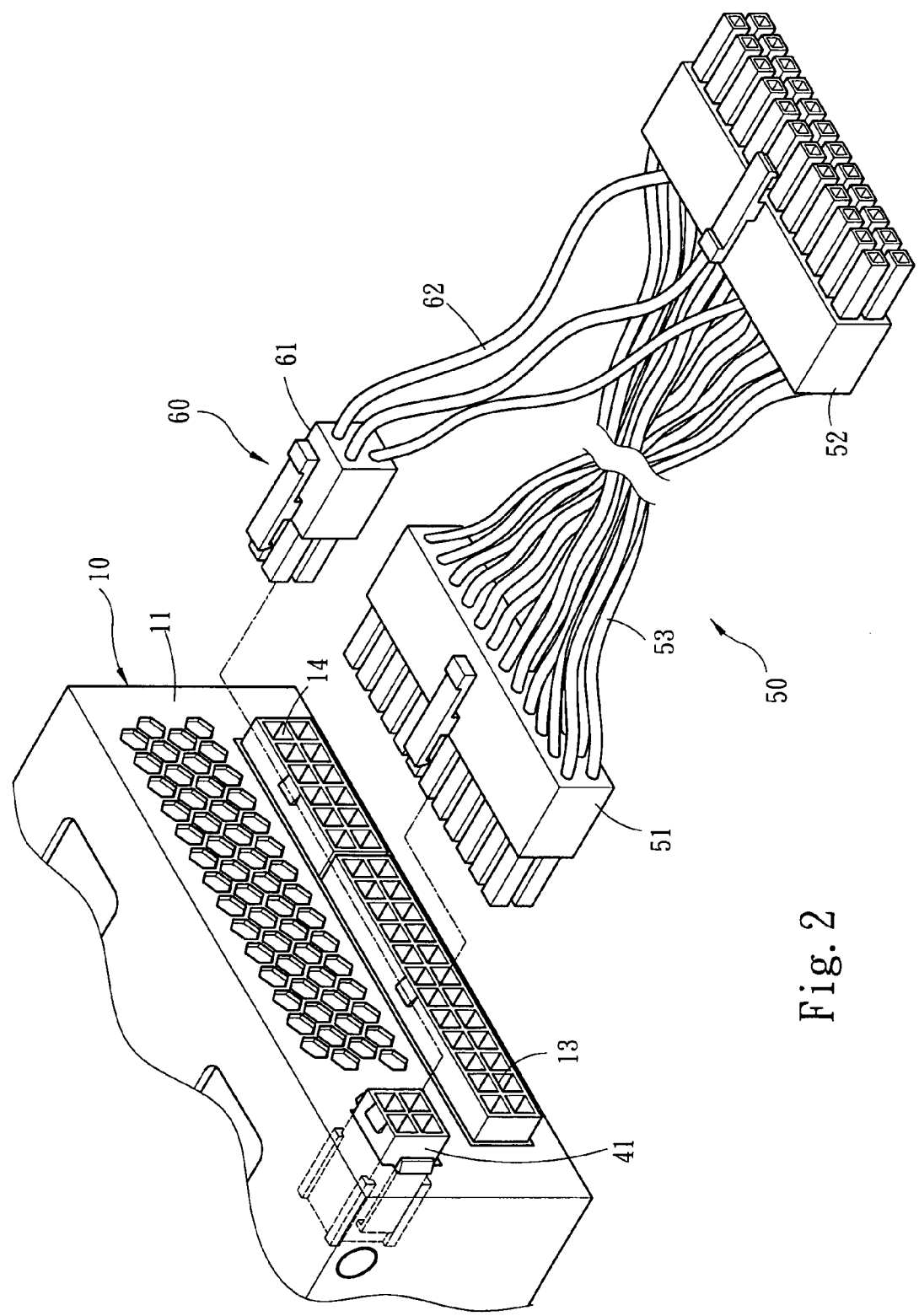
FIG. 2 is a schematic view of the power supply and transmission lines in a connecting condition according to the invention.

Please referring to FIGS. 1 and 2, the power compensation structure for a power supply 10 according to the invention employs a connector as power output ports. The power supply 10 includes a power input end 11 and a power output end 12. The power output end 12 has a first power output connector 13 and a first feedback signal connector 41. In an embodiment the first power output connector 13 has 24 pins to serve as an example for discussion. The number of pins may vary to be adopted to the connector of any specifications shown in the drawings in M260929 and M256525. The first power output connector 13 and electronic devices (not shown in the drawings) at a rear end are bridged by a first power transmission line set 50. The first power transmission line set 50 includes a first connector 51 inserting in the first power output connector 13, a second connector 52 inserting in the electronic devices at the rear end and a first conductive wire 53 bridging the first and second connectors 51 and 52. The first feedback signal connector 41 and the electronic devices at the rear end are bridged by at least one first feedback power line set 60. The first feedback power line set 60 includes at least a third connector 61 inserting in the first feedback signal connector 41 and a third conductive wire 62 connecting to the third connector 61. The third conductive wire 62 has other end joined the first conductive wire 53 to connect the second connector 52.

In this embodiment if there is any potential fluctuation (such as voltage drop) occurred to the power output by the power supply 10 through the first power output connector 13 via the first power transmission line set 50 to the second connector 52 connected to the electronic devices at the rear end, the actual power potential can be fed back via the third conductive wire 62 to the power supply 10 through the first feedback signal connector 41 to do potential correction. Hence the voltage input to the electronic devices at the rear end can be maintained at a constant potential.

Figure 3:
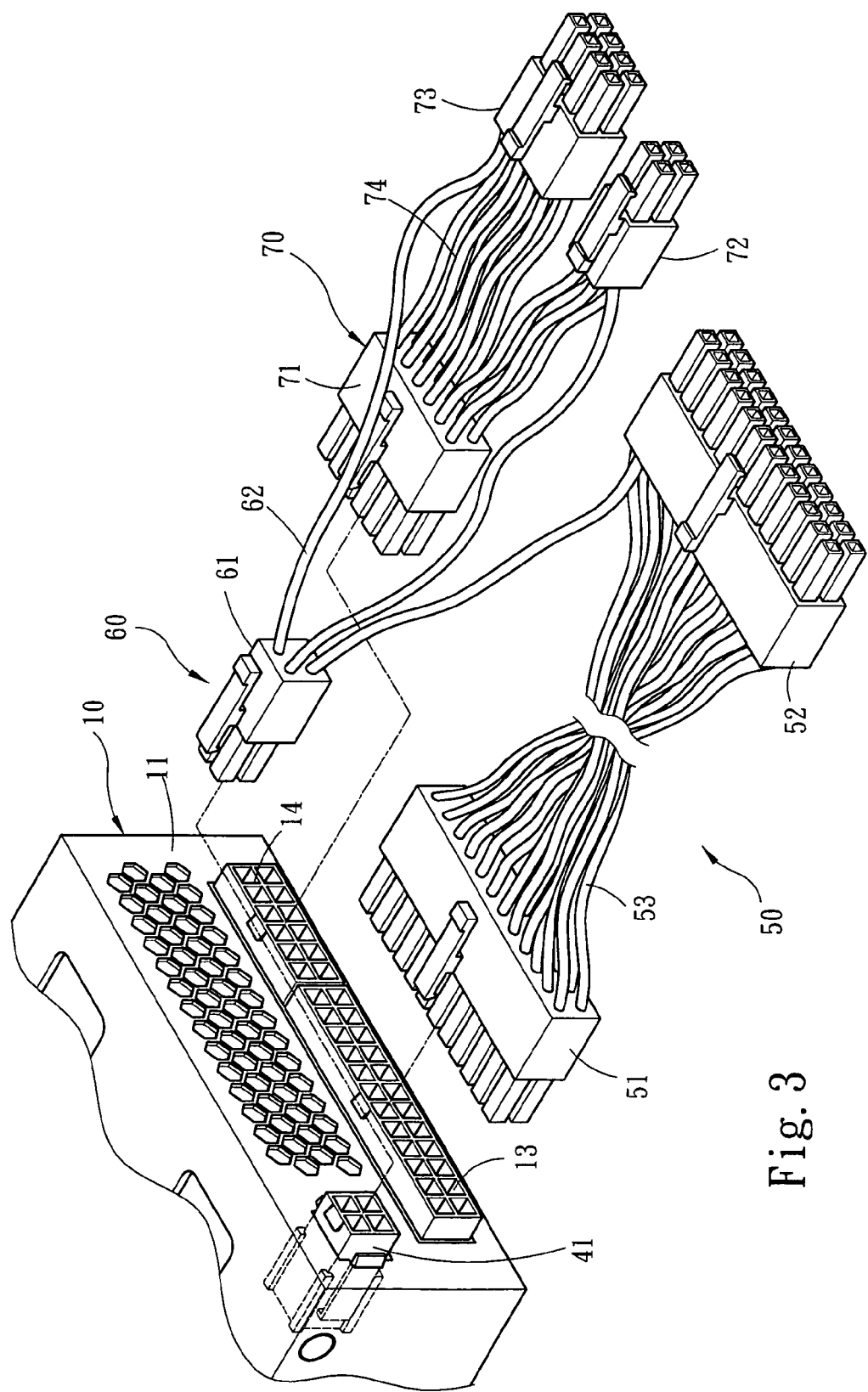
FIG. 3 is a schematic view of the power supply and transmission lines in another connecting condition according to the invention.
Figure 4:
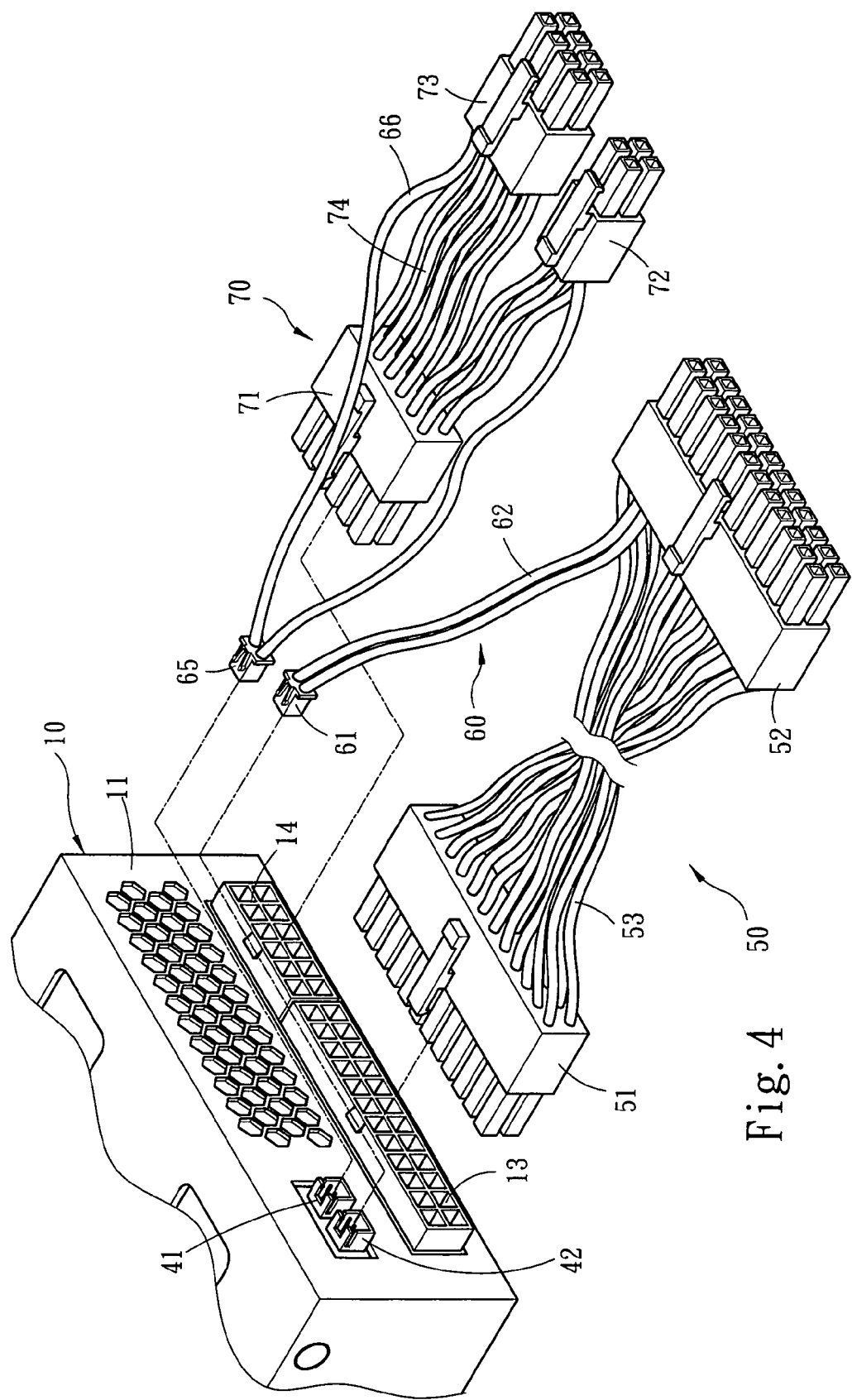
FIG. 4 is a schematic view of the power supply and transmission lines in yet another connecting condition according to the invention.
Figure 5:
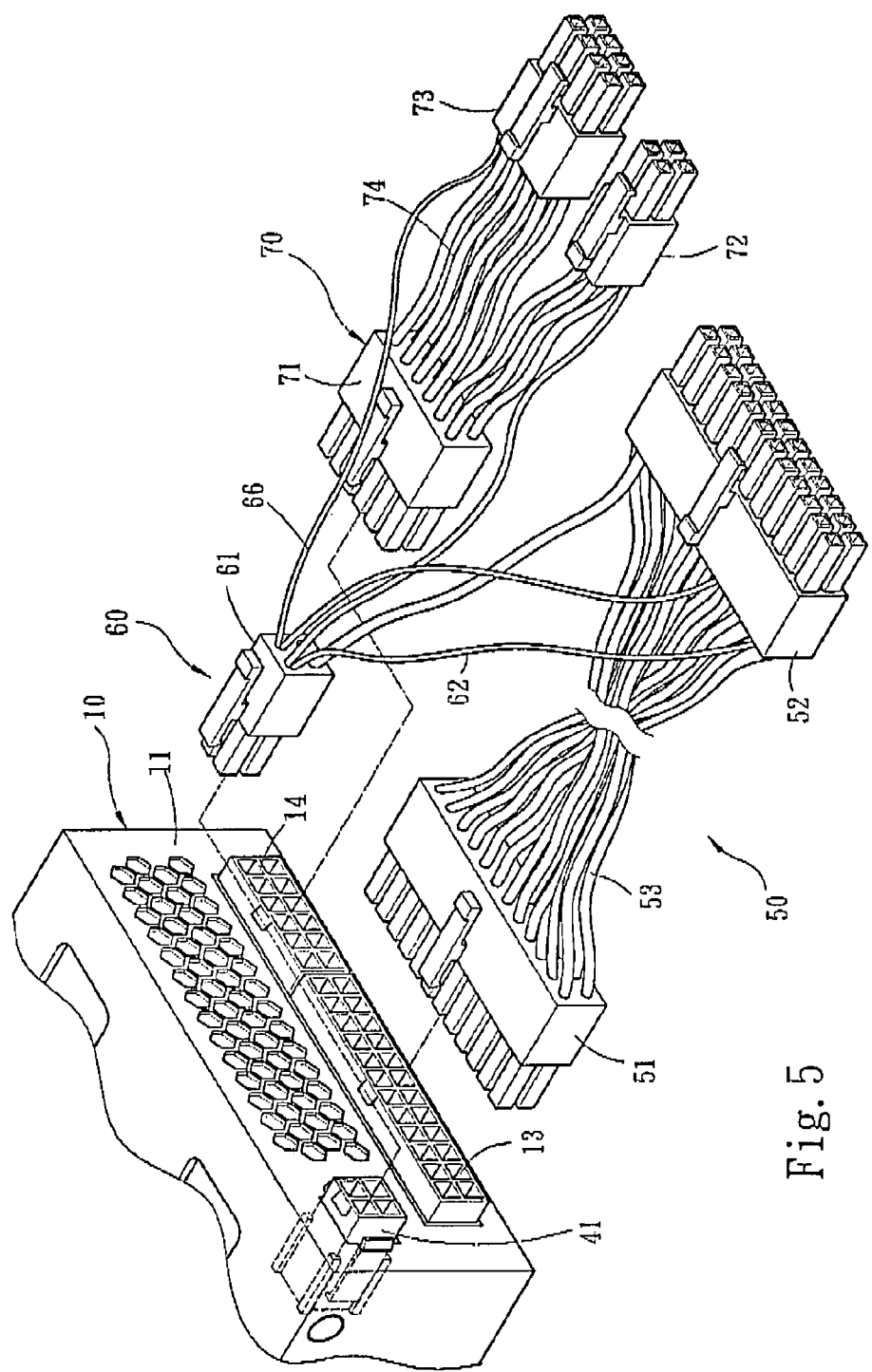
FIG. 5 is a schematic view of the power supply and transmission lines in still another connecting condition according to the invention.

Referring to FIG. 3, the power output end 12 further has a second power output connector 14 and a second power transmission line set 70. The second power transmission line set 70 includes a fourth connector 71 inserting in the second power output connector, fifth connectors 72 and 73 inserting in the electronic devices at the rear end and a second conductive wire 74 bridging the fourth and fifth connectors 71, 72 and 73. As shown in the drawings, the second power transmission line set 70 is coupled with a plurality of fifth connectors 72 and 73 that have different number of pins. The third conductive wire 62 of the first feedback power line set 60 is branched to jointly connect to the second connector 52 and fifth connectors 72 and 73 at the same time to be linked to the first feedback signal connector 41. Referring to FIG. 4, the power supply 10 may also have a second feedback signal connector 42 and a second feedback power line set. The second feedback power line set has at least one sixth connector 65 inserting in the second feedback signal connector 42 and a fourth conductive wire 66 connecting to the sixth connector 65. The fourth conductive wire 66 has other end joined the second conductive wire 74 to be connected to the fifth connectors 72 and 73. Similarly, the fourth conductive wire 66 may also be branched to concurrently connect the second connector 52 and fifth connectors 72 and 73. Referring to FIG. 5, the joint connection point may be the insertion pin location with the potential same as the second connector 52 and fifth connectors 72 and 73. And a third conductive wire 62 and the fourth conductive wire 66 are jointly connected to the third connector 61 of the first feedback signal line set 60. All the embodiments set forth above can monitor the power quality and maintain the actual voltage input to the electronic devices at a constant potential.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power supply power compensation structure, comprising:
    a power supply which has a power input end and a power output end, the power output end having a first power output connector and a first feedback signal connector;
    a first power transmission line set which includes a first connector inserting in the first power output connector, a second connector inserting in electronic devices at a rear end and a first conductive wire bridging the first connector and the second connector; and
    at least one first feedback power line set which has at least a third connector inserting in the first feedback signal connector and a third conductive wire connecting to the third connector, the third conductive wire having other end joined the first conductive wire to connect the second connector,
    wherein the power output end further has a second power output connector and a second power transmission line set, the second power transmission line set including a fourth connector inserting in the second power output connector, fifth connectors inserting in the electronic devices at the rear end and a second conductive wire bridging the fourth connector and the fifth connectors.

2. The power supply compensation structure of claim 1, wherein the third conductive wire is branched to connect the second connector and the fifth connectors.

3. The power supply power compensation structure of claim 1, wherein the power supply has a second feedback signal connector and a second feedback power line set, the second feedback power line set including at least a sixth connector inserting in the second feedback signal connector and a fourth conductive wire connecting to the sixth connector, the fourth conductive wire having other end joined the second conductive wire to connect the fifth connectors.

4. The power supply power compensation structure of claim 3, wherein the third conductive wire and the fourth conductive wire are joined to connect the third connector.

5. The power supply power compensation structure of claim 3, wherein the fourth conductive wire is branched to currently connect the second connector and the fifth connectors.

6. The power supply power compensation structure of claim 5, wherein the third conductive wire and the fourth conductive wire are joined to connect the third connector.

* * * * *